(12) United States Patent
Smorgon et al.

(10) Patent No.: US 10,976,217 B2
(45) Date of Patent: Apr. 13, 2021

(54) SYSTEM AND METHOD FOR INSPECTING OPTICAL POWER AND THICKNESS OF OPHTHALMIC LENSES IMMERSED IN A SOLUTION

(71) Applicant: EMAGE VISION PTE. LTD., Singapore (SG)

(72) Inventors: Sergey Smorgon, Singapore (SG); Ya'akob Bin Mohamed, Singapore (SG); Santosh Singh Elangbam, Singapore (SG)

(73) Assignee: EMAGE VISION PTE. LTD., Singapore (SG)

( * ) Notice: Subject to any disclaimer, the term of this patent is extended or adjusted under 35 U.S.C. 154(b) by 67 days.

(21) Appl. No.: 16/375,061

(22) Filed: Apr. 4, 2019

(65) Prior Publication Data

US 2019/0323920 A1  Oct. 24, 2019

(30) Foreign Application Priority Data

Apr. 19, 2018 (SG) ............... 10201803290

(51) Int. Cl.
*G01M 11/02* (2006.01)

(52) U.S. Cl.
CPC .... *G01M 11/0214* (2013.01); *G01M 11/0207* (2013.01); *G01M 11/0228* (2013.01); *G01M 11/0235* (2013.01); *G01M 11/0264* (2013.01); *G01M 11/0278* (2013.01)

(58) Field of Classification Search
CPC ......... G01M 11/0207; G01M 11/0214; G01M 11/0278; G01M 11/02
See application file for complete search history.

*Primary Examiner* — Hina F Ayub
*Assistant Examiner* — Amanda Merlino
(74) *Attorney, Agent, or Firm* — Thomas | Horstemeyer, LLP (57) ABSTRACT

A system for producing a high contrast image of an ophthalmic lens under inspection, comprising: top camera to view ophthalmic lens through lens module; motorized mechanism for positioning top camera at two pre-programmed positions; three illumination modules; said illumination modules focusing light through ophthalmic lens under inspection, thereby producing a high contrast image of features of ophthalmic lens; wherein ophthalmic lens is contained within cuvette with optical power of positive of ten; said cuvette mounted with two optical windows, one of them being vertical and other at an angle; said cuvette having transparent bottom glass suitably designed to position ophthalmic lens under inspection; said cuvette designed to be filled with saline solution; accurately calibrated test object positioned to achieve image of ophthalmic lens overlaid with image of pattern present on test object; additional illumination source comprising laser diode; and second camera to view ophthalmic lens through slanted optical lens module.

2 Claims, 6 Drawing Sheets

SYSTEM AND METHOD FOR INSPECTING OPTICAL POWER AND THICKNESS OF OPHTHALMIC LENSES IMMERSED IN A SOLUTION

CROSS-REFERENCE TO RELATED APPLICATIONS

This application claims priority to, and the benefit of, Singapore Patent Application No. 10201803290V, filed on Apr. 19, 2018, which is incorporated by reference as if set forth herein in its entirety.

FIELD OF THE INVENTION

The present invention relates to an apparatus and method for measuring optical power of Ophthalmic lenses. More specifically, the present invention relates to an apparatus and method to measure the optical power of contact lenses, which can be suitably integrated into an automated manufacturing system.

BACKGROUND OF THE INVENTION

A number of prior art measuring systems exist in which the optical power and other characteristics of ophthalmic lenses are measured at local points on the ophthalmic lens. Commercial instruments for performing optical power measurements that use probing beams combined with dynamic positioning to measure optical power of the lens are available. However these instruments cannot be integrated into high speed automated manufacturing systems because of the time required to inspect each lens, making them unsuitable for such a purpose. Ophthalmic lenses are manufactured to suit different types of eye characteristics. The lenses need to be appropriately categorized and segregated before distribution according to their optical power.

In light of the above, there is need for an automated system or apparatus and method to accurately and reliably measure the optical power of the lens within a fraction of a second, so as to be able to integrate the apparatus into automated manufacturing systems.

SUMMARY OF THE INVENTION

To achieve this end, an embodiment of the invention comprises: A high resolution imaging device to capture the image of the contact lens; a positioning mechanism to move the Camera to a first position using a motorised mechanism; enabling the test object LED based light head to effectively illuminate the glass target and capture an image of the glass target as seen through an empty cuvette filled with Saline solution;

It is an object of the present invention to provide an apparatus and method for inspecting the optical power of the contact lens. The process begins by moving the Top camera to the first position and capturing an image of the Test object through a contact lens with zero optical power and the cuvette filled with Saline solution. This image is subsequently used as a reference image. Subsequently calibration of the Top camera 14 is carried out using the reference image by measuring and tabulating the distance between adjacent dots preferably in X, Y and Z direction using a set of software algorithms; loading a contact lens with optical power into the cuvette; enabling the test object light head to illuminate the lens under inspection and capture an image of the glass target as seen through the contact lens suspended in the Saline solution; measuring the distance between all adjacent dots with the optical zone in X, Y and Z direction; using the distance value to determine the optical power of the lens; and a display means for displaying and notifying a result judged by the software program. The result may also be communicated via electronic means to enable integration to third party equipment.

It is further an object of the present invention to provide an apparatus and method to inspect for defects such as tear, cuts, voids, bubbles, mold flash and foreign material within a contact lens comprising: A high resolution imaging device to capture the image of the contact lens; a positioning mechanism to move the Camera to a second position using a motorised mechanism; enabling multiple illumination modules at different times to effectively highlight various defects in the contact lenses; capturing multiple images under different illuminating conditions; analysing the images using multiple set of software algorithms to detect and identify the defective contact lenses; and communicating the results of the inspection to the host machine to remove the defective lenses.

It is further an object of the present invention to provide an apparatus and method to inspect for the thickness of the contact lens comprising; A second high resolution imaging device mounted at an angle to the contact lens under inspection; enabling the laser diode base illumination module; capture an image of the contact lens with the second camera; analysing the image using a separate set of algorithms to measure the thickness of the lens; and communicating the results of the inspection to the host machine to take further steps such as segregating lenses of different thickness.

BRIEF DESCRIPTION OF THE DRAWINGS

A complete understanding of the present invention may be gained by considering the following detailed description together with the accompanying drawings, in which:

FIG. 1 shows, in pictorial form, a preferred embodiment of a first aspect of the present invention which is apparatus for measuring the optical power, identifying defects such as cuts, tears, voids, bubbles, mold flash and foreign material and the thickness of ophthalmic lenses. The apparatus comprises of three different parts 100, 200 & 300. Module 100 comprises the cameras and the objectives & 200 comprises the complex illumination module along with the necessary lenses and prisms to guide and focus the illumination towards the contact lens and 300 is a specially designed cuvette in which the contact lens under inspection is loaded and two optical windows that allows the vertical camera and the slant camera to view and capture the image of the contact lens; specially designed cuvette is filled with Saline solution;

DETAILED DESCRIPTION

Figure 1:
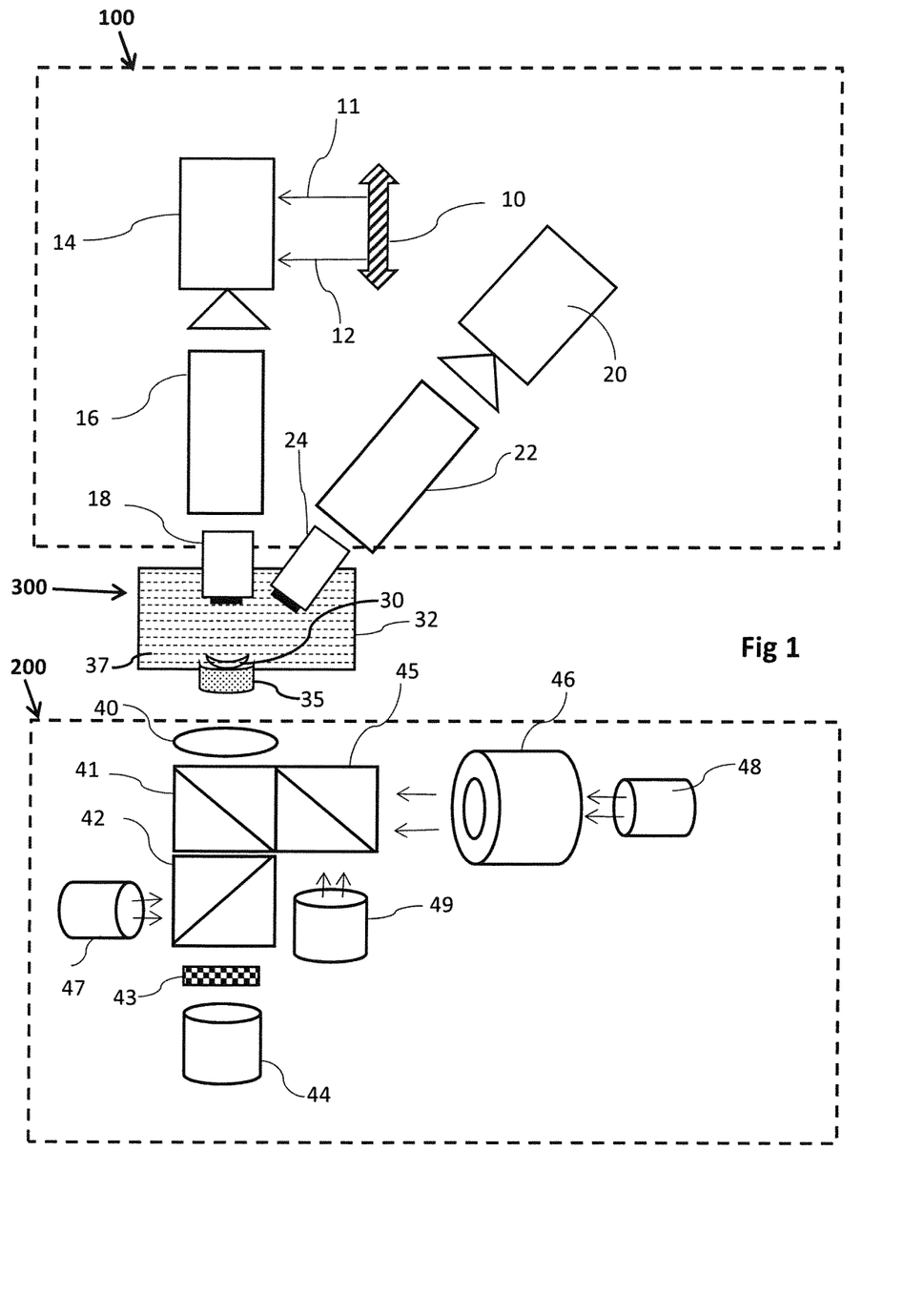

FIG. 1 shows, in pictorial form, an embodiment of a first aspect of the present invention which is apparatus for measuring the optical power, thickness and various other defects such as bubbles, scratches, contaminants & edge defects of contact lenses. The embodiment consists of two main parts.

The first part is as follows. The camera and lens module 100 is made up of a Top camera 14 mounted vertically and driven by a motorized mechanism 10 to position the camera 14 at different positions 11 and 12 in the vertical axis. The camera 14 is suitably integrated to the lens module 16. The second camera 20 mounted at an angle is suitably integrated to the lens module 22. The flat window 18 and side inclined window 24 enable image capture of the contact lens 30 by cameras 14 and 20 respectively. First position 12 of camera 14 is preferably used to inspect the optical power of the contact lens and the second position 11 of camera 14 is preferably used to inspect for defects such as bubbles, scratches, contaminants & edge defects.

The second part 200 is a complex illumination module and comprises several illumination modules that are utilized in various combinations, to illuminate certain specific defects in the contact lenses.

Figure 2:
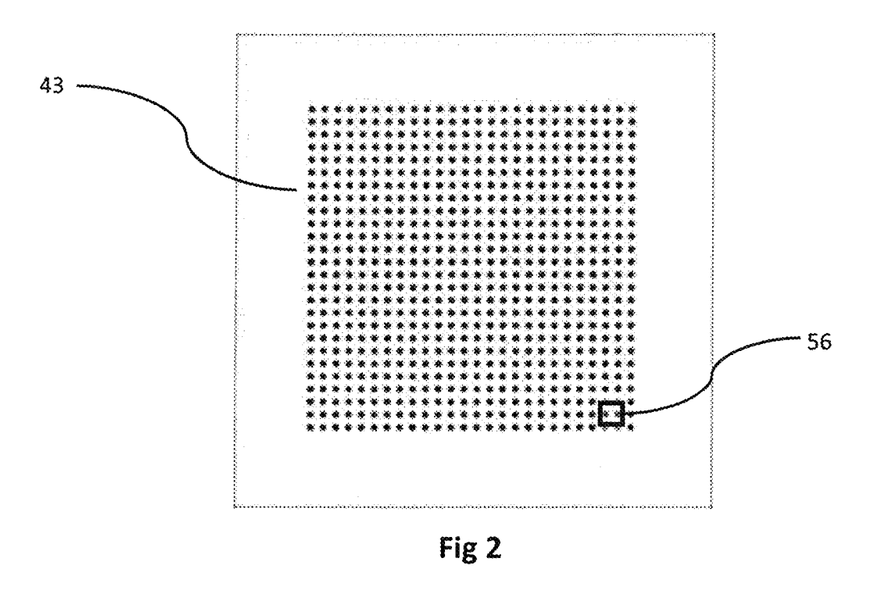
FIG. 2 shows, a sample of a precision glass based calibration target available from any optics accessories supplier.
Figure 3:
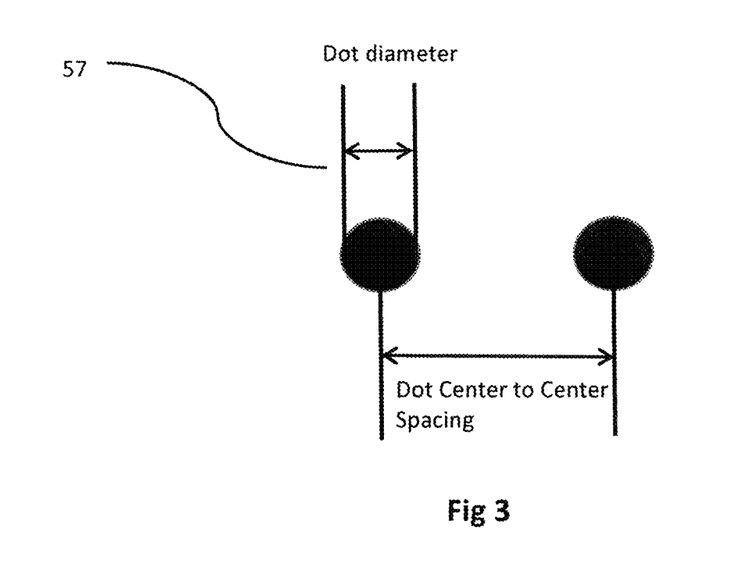
FIG. 3 shows, an enlarged view of the area enclosed by the box 41 in the precision glass target. The distance between a pair of dots, and the diameter of the every adjacent dot is measured and stored as calibration data.

The illumination module 44 is enabled only for optical power measurements and for the purpose of calibrating the inspection system using the test object 43. The beam splitters 41 and 42 directs the Bright field illumination from 49 towards the contact lens 30 that is suspended in Saline solution in Cuvette 32 and suitably positioned on bottom glass 35. The beam splitters 41 and 42 also directs illumination from Test object illumination module 44 towards the contact lens 30 which is suspended in Saline solution in Cuvette 32 and suitably positioned on bottom glass 35. The Test object 43 is positioned between the Target object illumination module 44 and the beam splitter 42 to enable Top camera 14 to capture the image of the test object. The test object is preferably a precision glass object on which a pattern of precisely sized dots are imprinted as shown in FIG. 2. The test object shown in FIG. 2 is a typical glass target available from many optics accessories supplier and FIG. 3 shows a enlarged representation of two adjacent dots imprinted on the glass object of FIG. 2 The glass target 43 maybe of several types, one of which is shown in FIG. 2. The lens 40 works as a focusing lens to focus all the light towards the cuvette.

The illumination modules 46, 48 and 49 are used individually or in a predetermined combination to enhance defects such as tear, cuts, voids, bubbles, mold flash and foreign material within the contact lens. Beam splitters 45 and 41 direct the light emitted by illumination modules 46, 48 and 49 and beam splitters 42 and 41 direct the light emitted by 47 and 44 towards the contact lens 30 which is suitably positioned on bottom glass 35.

The third part 300 is the contact lens cuvette 32 wherein the Contact lens 30 to be inspected is positioned. The cuvette 32 is filled by saline and contact lens 30 and is suitably positioned on bottom glass 35 are placed in the Saline solution 37. The container also comprises of a flat window 18 and side inclined window 24 for the camera 14 and 20 respectively.

The functionality of each the first part 100, second part 200 and third part 300 is such that each can be separately used with different apparatus. Further, whilst the thickness measurement and power measurement are described herein as operating together to form the first part 100, these two may be used with other apparatus. It follows that the various aspects of the invention include the following, which may be used as separate components for other applications, used in various combinations or together as an assembly of functional components, as described herein:

The power measurement & defect detection system (14, 16, 18);
The thickness measurement system (20, 22, 24);
The glass target 43, and;
The illumination module 200.

The method of inspection for optical power relies on the average distance between a set of pre-selected dots of the captured image of different contact lens with different optical power. To enable the measurement of negative power lenses the cuvette is designed to have an optical power above 10 above zero optical power so any contact lenses with optical power from negative 10 to positive 10 can be measured. As a test object, round dots are chosen because position of image center of such object can be measured even with a significant defocusing.

The illumination modules used to inspect for contact lens defects such as tear, cuts, voids, bubbles, mold flash and foreign material are a bright field illuminator 49, a Dark field illuminator 46 and a Single Spot illuminator 48. The Laser Diode illuminator 47 is enabled only for measuring thickness of the contact lens.

The Single spot illumination from 48 is directed towards the contact lens 30 suspended in saline solution in cuvette 32, by beam splitters 45 and 41. The lens 40 is used to focus all the different illuminations towards the cuvette. The Laser Diode illumination 47 is utilized for measuring thickness of the contact lens.

FIG. 2 shows a sample of a glass target 43 with several dots precisely imprinted on a precision glass target. The glass target and the printed pattern may change according to the requirements of inspection characteristics.

FIG. 3 shows an enlarged view of two printed dots 56 on target 43 of FIG. 1. In the calibration process, images of known powered lenses are used for capturing images and the average distances across the preselected set of dots are plotted to arrive at the chart in FIG. 8.

Figures 4, 4A:
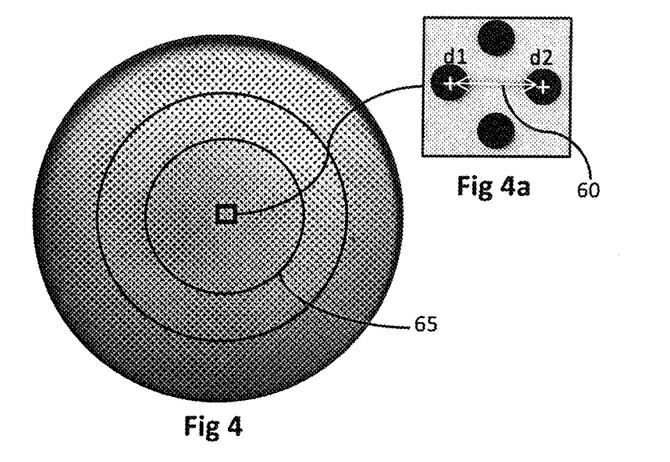
FIG. 4, shows an illustration of an image of the precision target object with cuvette filled with Saline solution captured through a contact lens with a zero optical power contact lens positioned in the cuvette.
FIG. 4a, shows an enlarged view of the area enclosed by the box in FIG. 4.
Figure 5:
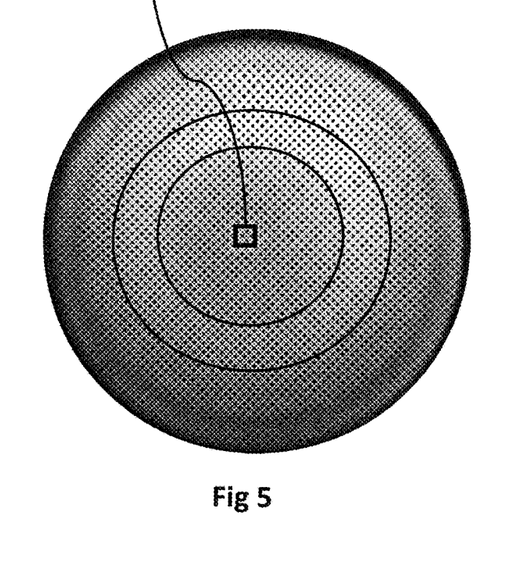
FIG. 5, shows an illustration of an image of the precision target object as seen through a positive power contact lens located in the cuvette filled with Saline solution.
Figure 5A:
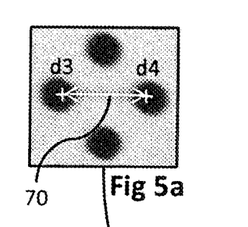
FIG. 5a, shows an enlarged view of the area enclosed by the box in FIG. 5.

FIG. 4 shows a image of the glass target as captured by the Top camera 14 located in the first position and a zero power contact lens mounted in the cuvette. FIG. 4a is an enlarged image of the box in FIG. 4. The distance 60 between the center of dots d1 and d2 is measured and stored in a table. The process is repeated for a set of 18 to 20 dots selected from the optical area 65. The preselected set of dots (determined at the time of calibration) is adjacent to each other and maybe in the horizontal, vertical or angular direction as long as they fall within the optical area 65. FIG. 5 is the image of the same target glass 43 in FIG. 1 captured with a contact lens with positive optical power placed in the cuvette and with the Top camera 14 in the first position. FIG. 5a is an enlarged image of the box in FIG. 5. The process of measuring the distance 70 between two adjacent dots d3 and d4 and repeating the process for the preselected set of dots (determined at the time of calibration) located within the optical area of the contact lens is executed and the results tabulated.

Figure 6:
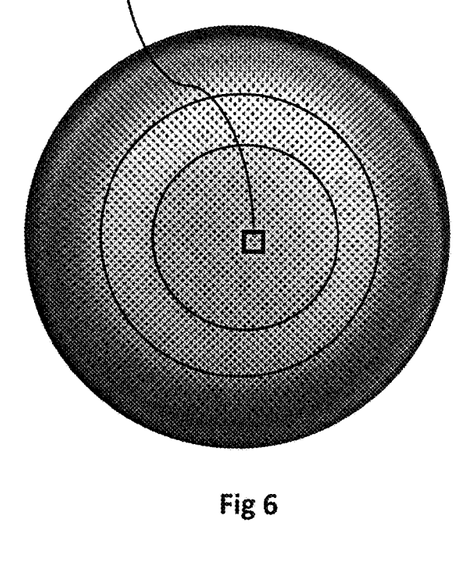
FIG. 6, shows an illustration of an image of the precision target object as seen through a negative power contact lens located in the cuvette filled with Saline solution.
Figure 6A:
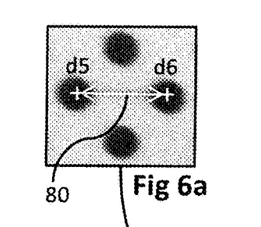
FIG. 6a, shows an enlarged view of the area enclosed by the box in FIG. 6.

FIG. 6 is the image of the same target glass 43 in FIG. 1 captured with a contact lens with negative optical power placed in the cuvette and with the Top camera 14 in the first position. FIG. 6a is an enlarged image of the box in FIG. 6. The process of measuring the distance 80 between two adjacent dots d5 and d6 and repeating the process for the preselected set of dots (determined at the time of calibration) located within the optical area of the contact lens is executed and the results tabulated.

Figure 7:
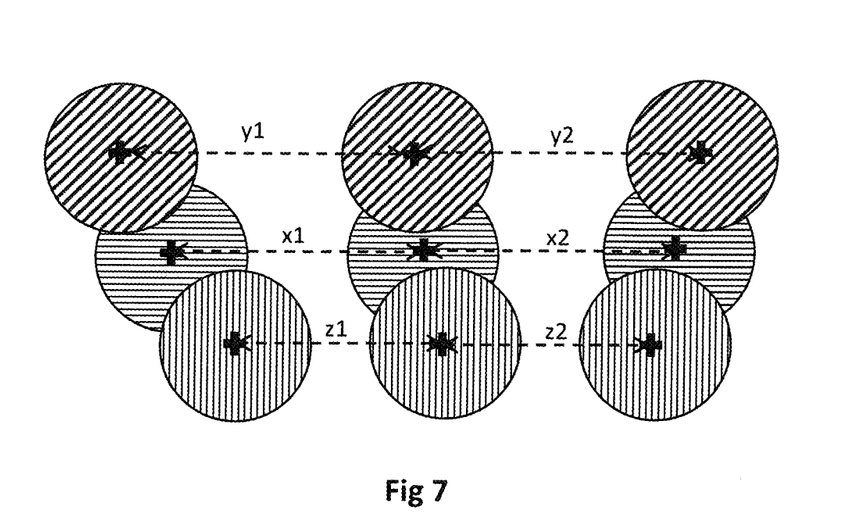
FIG. 7, shows an illustration of a drawing showing three adjacent dots of a positive power lens and a negative power lens, superimposed on three adjacent dots of the glass target.

FIG. 7 is a pictorial representation of the process of measuring the power of the different contact lenses shown in FIGS. 4, 5 & 6. For the purpose of easy understanding the drawing shown in FIG. 7 refers to 3 dots, though more number of dots can be used to measure the distances. x1 and x2 refers to distances between three dots selected from FIG. 4 that represents the image of the glass target with no contact lens loaded in the cuvette. y1 and y2 refers to distances between three dots selected from FIG. 5 that represents the image of the glass target with a positive power contact lens loaded in the cuvette. z1 and z2 refers to distances between three dots selected from FIG. 6 that represents the image of the glass target with a negative power contact lens loaded in the cuvette. Taking the averages of x1 and x2, y1 and y2 and z1 and z2 will result in x, y and z.

Figure 8:
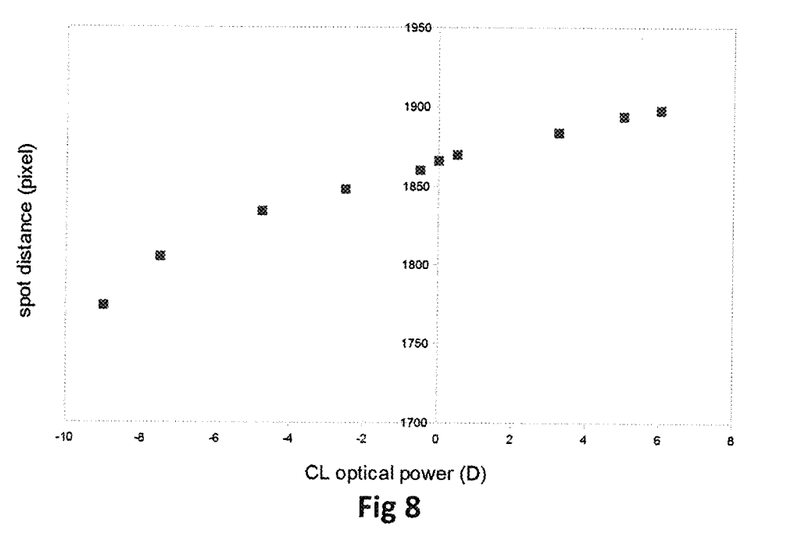
FIG. 8, shows a chart demonstrating the relation between the optical power of contact lenses and the distance between two selected dots within the optical zone of a contact lens with optical power.

Distances x, y and z are plotted and with the calibration chart in FIG. 8 to determine the power of the contact lens under inspection. The results are subsequently relayed to the integrated system for further action.

Any changes in the fundamental configuration of the inspection apparatus will require a calibration process to be redone to arrive at a new calibration chart such as the one in FIG. 8. The change can include but not limited to the position of focus, the type of saline solution, a change or modification in the position of any of the optical elements of the inspection system such as the Camera resolution, Camera position, Camera lens, cuvette material or its configuration, Glass target configuration, illumination intensity, illumination pattern, Glass target position, Prism configuration or position and a combination of any of the above.

Figure 9:
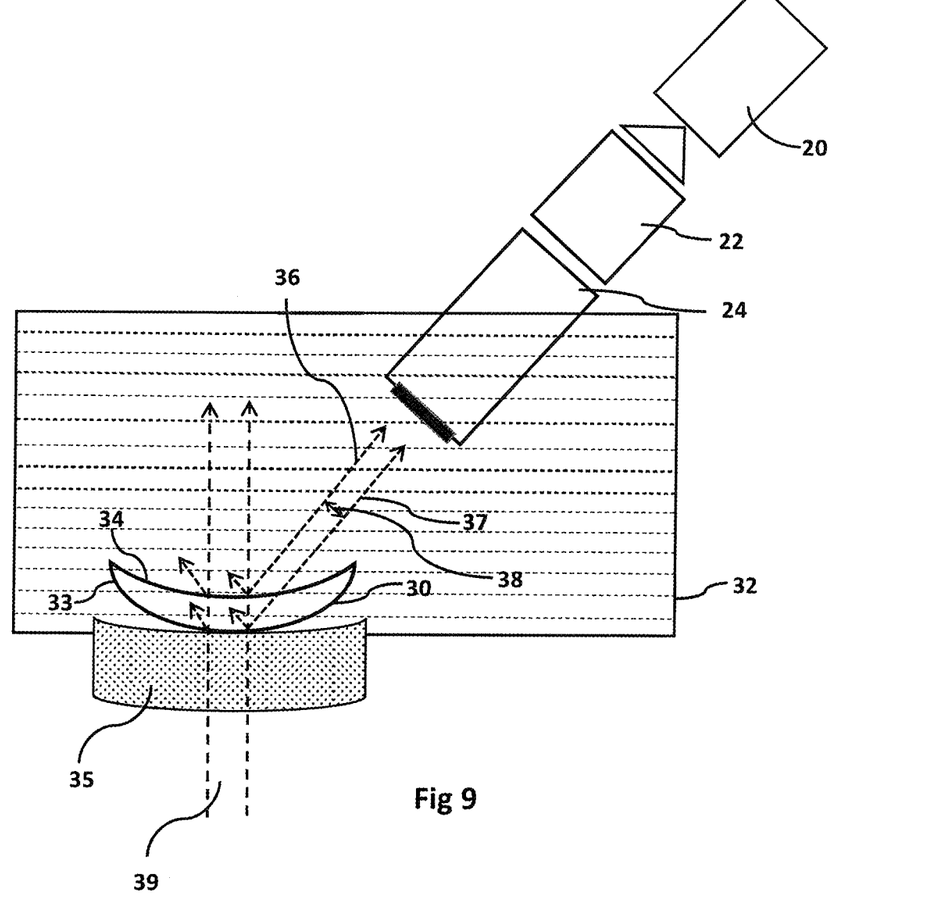
FIG. 9 is an illustration of the sub-system extracted from FIG. 1, which is used to measure the thickness of the contact lens.
Figure 10:
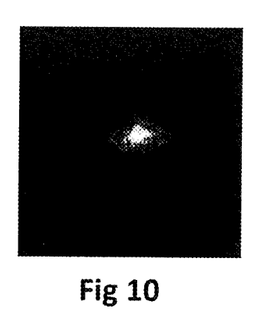
FIG. 10 is an image of the laser beam emitted by laser diode light head 47 in FIG. 1 as viewed by the camera 20 in FIG. 9 with no contact lens present in the cuvette.
Figure 11:
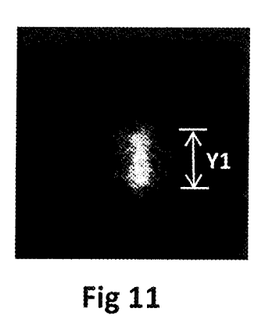
FIG. 11 is an image of the laser beam emitted by laser diode light head 47 in FIG. 1 as viewed by the camera 20 in FIG. 9 with a thin contact lens present in the cuvette.
Figure 12:
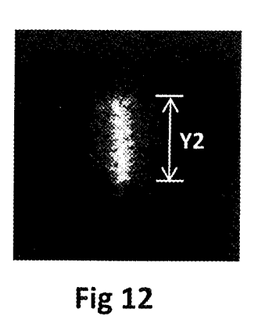
FIG. 12 is an image of the laser beam emitted by laser diode light head 47 in FIG. 1 as viewed by the camera 20 in FIG. 9 with a thicker contact lens present in the cuvette.
Figure 13:
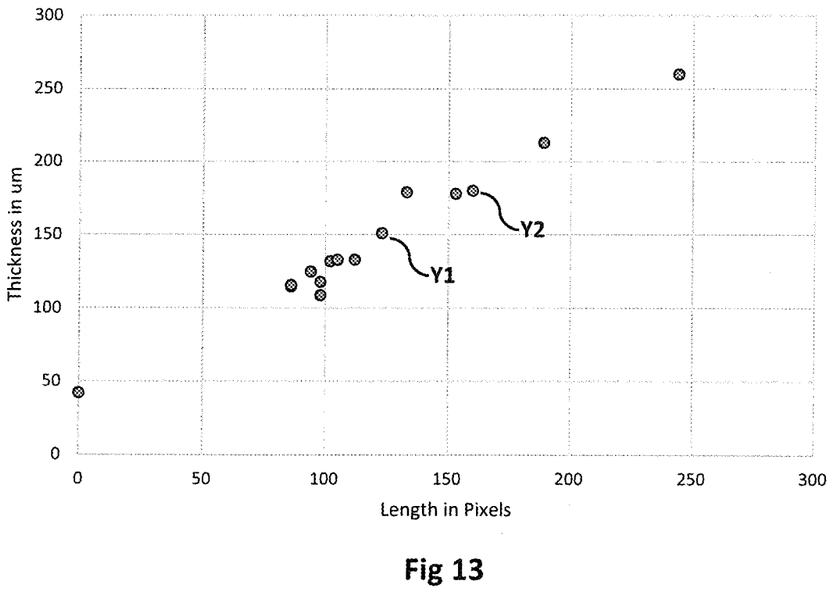
FIG. 13 is an illustration of a chart used as a reference to compute the thickness of the contact lens after measuring the length of the scattered laser beam Y1 in FIG. 11 and Y2 in FIG. 12.

In FIG. 9, the sub-system of the apparatus shown in FIG. 1 highlights the modules used to measure the contact lens thickness. The sub-system constitutes the Camera 20 suitably integrated to the optical lens 22 and the side inclined window 24. The camera 20 captures the image of the contact lens 30 which is suspended in saline solution in the cuvette 32 and suitably positioned on bottom glass 35. The contact lens 30 is illuminated by a laser beam 39 emitted by the laser diode illumination module 47 of FIG. 1, and subsequently guided by beam splitters 42 and 41 as shown in FIG. 1. The principle behind the measurement of thickness relies on the laser light 39 being scattered by contact lens material and its surfaces 33 and 34 indicated in FIG. 9. For the purpose of understanding, a single ray scattered from the two surfaces of the contact lens is shown in the FIG. 9. When the laser beam 39 is incident on the contact lens 30 of FIG. 9, the laser rays scatter in different directions. The scattering of the laser light is directly proportional to the thickness of the contact lens. The distance 38 measured between the scattered rays 36 and 37, represents a proportional value of the thickness of the contact lens 30. As evident the smaller the distance 38, the smaller is the thickness of the contact lens. The distance 38 is shown as Y1 and Y2 in FIG. 11 and FIG. 12 respectively and is measured in pixels. A relatively higher distance 38, represents a thicker contact lens. A pre-configured chart FIG. 13 showing proportional thickness values which are directly proportional to the distances 38 in FIG. 9, is created and subsequently used to determine the thickness value of the contact lens under inspection. For calibration purposes, an image of an empty cuvette (no contact lens present) is shown in FIG. 10. The chart is created by capturing images of n number of contact lenses with known thickness values and subsequently measuring the distance Y1, Y2 . . . Yn in the captured images. The values Y1, Y2 . . . Yn are then used to create a chart such as the one shown in FIG. 13. The refractive index of the saline solution, and the effect of the cuvette are considered during the creating of the table to determine thickness of the contact lenses. Any change in the liquid or power of the cuvette holder, will require a new calibration chart such as the one shown in FIG. 13 will have to be created. Due to the low divergence characteristics of the laser beam, the distance 38 in FIG. 9, translates to a fairly accurate value of the thickness of the contact lens.

Many modifications and variations of the present invention can be achieved without departing from its spirit and scope, as it will become to one skilled in the art. The embodiments described herein as offered by way of example only and the invention should not be construed as limited in its scope.

The invention claimed is:

1. A method for determination of optical power of a test ophthalmic lens the method comprising the steps of:
   moving a camera to a first position;
   providing an inspection cuvette designed with an optical power of positive ten comprising an optically transparent bottom glass having a concave inner surface containing a reference ophthalmic lens of zero optical power immersed in a liquid, and positioning the inspection cuvette in the optical axis of the camera;
   providing a set of illumination sources and the camera for receiving illumination having passed through a calibration target and subsequently through the reference ophthalmic lens contained in the inspection cuvette to produce an overlaid image;
   measuring the distance and tabulating the measurements between several predetermined set of target points representative of the optical power of the reference ophthalmic lens;

creating a calibration chart of measurements in pixels between pre-determined set of target points using several pre-selected ophthalmic lens with known optical power;

providing the inspection cuvette designed with an optical power of positive ten, comprising the optically transparent bottom and containing the liquid with a test ophthalmic lens positioned at the center of the bottom glass;

providing the set of illumination sources and the camera for receiving illumination having passed through the calibration target and subsequently through the test ophthalmic lens to produce an overlaid image; and measuring the distance between several pre-determined set of target points and determining the optical power of the test ophthalmic lens from the calibration chart.

2. The method according to claim 1, further comprising the steps of:

removing and segregating the test ophthalmic lens under inspection based on its optical power.

* * * * *